United States Patent [19]

Harada et al.

[11] Patent Number: 4,654,149

[45] Date of Patent: Mar. 31, 1987

[54] PROCESS FOR TREATING AMMONIUM NITRATE-CONTAINING WASTE WATER

[75] Inventors: Yoshiaki Harada, Kyoto; Teizou Okino, Amagasaki; Hiroyuki Mathura, Ibaraki; Yasuhumi Doi, Settsu; Kenichi Yamasaki, Gose, all of Japan

[73] Assignee: Osaka Gas Company Limited, Japan

[21] Appl. No.: 843,677

[22] Filed: Mar. 25, 1986

[30] Foreign Application Priority Data

Mar. 28, 1985 [JP] Japan .................................. 60-64227
Mar. 28, 1985 [JP] Japan .................................. 60-64228
Mar. 28, 1985 [JP] Japan .................................. 60-64229

[51] Int. Cl.$^4$ ............................................. C02F 1/58
[52] U.S. Cl. ..................................... 210/763; 210/903
[58] Field of Search .............................. 210/761–763, 210/903, 919, 766

[56] References Cited

U.S. PATENT DOCUMENTS 4,141,828  2/1979  Okada et al. ........................ 210/762
4,294,706 10/1981  Kakihara et al. ................... 210/762
4,447,333  5/1984  Wagener et al. ............... 210/763 X

FOREIGN PATENT DOCUMENTS 53-102866  7/1978  Japan .................................. 210/763

Primary Examiner—Tom Wyse
Attorney, Agent, or Firm—Larson and Taylor

[57] ABSTRACT

This invention provides a process for treating ammonium nitrate-containing waste water which comprises subjecting the waste water to wet thermal decomposition in the presence of a catalyst supported by a carrier and containing as an active component at least one of precious metals and compounds thereof insoluble or sparingly soluble in water while maintaining the waste water at a pH of about 3 to about 11.5 and a temperature of about 100° to about 370° C.

46 Claims, No Drawings

PROCESS FOR TREATING AMMONIUM NITRATE-CONTAINING WASTE WATER

This invention relates to processes for treating ammonium nitrate--containing waste water.

In recent years, it has become important from the viewpoint of water-quality control to remove nitrogen components (particularly "ammonia nitrogen") as well as chemically oxidizable substances (hereinafter referred to as "COD components") from waste water.

We conducted extensive research for a long time on processes for treating ammonia-containing waste water and developed processes for treating ammonia-containing waste water with ease and with economical feasibility; the processes comprise in general subjecting waste water to wet oxidation in the presence of a specific catalyst and under specified conditions (namely processes disclosed in Japanese Examined Patent Publications Nos. 19757/1984; 42992/1981; 42391/1982; 27999/1983; 33320/1982, etc.).

With greater weight recently attached to nuclear power generation in power generating industry, one of important technological problems before us is the treatment of $NH_4NO_3$-containing waste water from the processing of uranium ores and reprocessing of the used uranium fuel. We attempted to treat such $NH_4NO_3$-containing waste water by adapting the foregoing processes for treating ammonia-containing waste water (hereinafter referred to as "prior processes") and found that the prior processes achieve the decomposition of $NH_4^+$ ion with a high efficiency but the decomposition of $NO_3^-$ ion with an efficiency not invariably satisfactory. This drawback is presumably caused by the presence of $NH_4NO_3$ in a concentration as high as about 1% (10,000 ppm) to about 10% (100,000 ppm).

To overcome the foregoing drawback, we carried out further research and discovered that $NO_3^-$ ion as well as $NH_4^-$ is efficiently decomposed when subjecting $NH_4NO_3$-containing waste water to wet thermal decomposition substantially in the absence of oxygen or in the presence of oxygen in less than the theoretical amount required for the decomposition of the ammonia components, organic substances and inorganic substances present in the waste water instead of subjecting the waste water to the prior processes in which the wet oxidation of waste water is effected using oxygen in more than the theoretical amount required for the decomposition of the ammonia components, organic substances and inorganic substances contained in the waste water. Our continued research demonstrated that when subjecting to the wet thermal decomposition in the presence of oxygen in less than the theoretical amount $NH_4NO_3$-containing waste water having incorporated therein ammonia in a mole ratio of $1 < NH_3\text{-}N/NO_3\text{-}N \leq 5$, the decomposition of components is achieved with a further improved efficiency. Through our more investigations, we also found that when subjecting to the wet thermal decomposition in the presence of oxygen in less than the theoretical amount $NH_4NO_3$-containing waste water having incorporated therein not more than 1 mole of COD component per mole of $NO_3^-$ ion, the $NH_4^+$ and $NO_3^-$ ions decompose with a high efficiency and that when subjecting to the wet thermal decomposition in the presence of oxygen in less than the theoretical amount $NH_4NO_3$-containing waste water having incorporated therein ammonia in a mole ratio of $1 < NH_3\text{-}N/NO_3\text{-}N \leq 5$ and not more than 1 mole of COD component per mole of $NO_3^-$ ion, the $NH_4^+$ and $NO_3^-$ ions decompose with a higher efficiency. More specifically, this invention provides five kinds of processes for treating waste water.

(1) A process for treating ammonium nitrate-containing waste water which comprises subjecting the waste water to wet thermal decomposition substantially in the absence of oxygen and in the presence of a catalyst supported by a carrier and containing as an active component at least one of precious metals and compounds thereof insoluble or sparingly soluble in water while maintaining the waste water at a pH of about 3 to about 11.5 and a temperature of about 100° to about 370° C., (2) A process for treating ammonium nitrate-containing waste water which comprises subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C., (3) A process for treating ammonium nitrate-containing waste water which comprises the steps of adding to the waste water ammonia in a mole ratio of $1 < NH_3\text{-}N/NO_3\text{-}N \leq 5$, and subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

(4) A process for treating ammonium nitrate-containing waste water which comprises the steps of adding to the waste water not more than 1 mole of COD component per mole of $NO_3^-$ ion, and subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

(5) A process for treating ammonium nitrate-containing waste water which comprises the steps of adding to the waste water not more than 1 mole of COD component per mole of $NO_3^-$ ion and ammonia in a mole ratio of $1 < NH_3\text{-}N/NO_3\text{-}N \leq 5$, and subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

Throughout the specification and the appended claims, the term "theoretical amount" used in respect of oxygen means "theoretical amount required for the decomposition of the ammonia, organic substances and inorganic substances present in the waste water to $N_2$, $H_2O$ and $CO_2$, and the term "$NH_3$-N" and the term "$NO_3$-N" refer to "ammonia nitrogen" and "nitrate nitrogen", respectively.

The waste waters which can be treated by the processes of this invention include all kinds of waste waters containing $NH_4NO_3$ among which the waste water having a $NH_4NO_3$ concentration of as high as 1% or more is preferred. The waste waters to be treated by the processes of the invention may contain both organic and inorganic substances. The processes of the invention achieve a high efficency when carried out at a pH of about 3 to about 11.5, preferably about 5 to about 11. Therefore, when required, the pH of the waste water may be suitably adjusted with an alkali substance such as sodium hydroxide, sodium carbonate, calcium hydroxide, etc.

Examples of active components of catalysts which can be used in this invention are ruthenium, rhodium, palladium, osmium, iridium, platinum and gold, and the compounds thereof insoluble or sparingly soluble in water. These active components can be used singly or at least two of them are usable in mixture. Examples of useful compounds which are insoluble or sparingly soluble in water are ruthenium dichloride, platinum dichloride, ruthenium sulfide, rhodium sulfide, etc. These active components of catalysts are used as supported in a conventional manner by a carrier such as titania, zirconia, alumina, silica, alumina-silica, active carbon, and porous bodies of metals such as nickel, nickel-chromium, nickel-chromium-aluminum, nickel-chrominum-iron and the like. The amount of the active components to be supported by the carrier ranges from about 0.05 to about 25%, preferably about 0.5 to about 3%, based on the weight of the carrier. The catalyst can be used in the form of globules, pellets, cylinders, crushed fragments, particles or in any other desired form. When the reaction column used has a fixed bed, the waste water is passed therethrough preferably at a space velocity of about 0.5 to about 10 l/hr, preferably about 1 to about 5 l/hr, based on an empty column. The grains or pieces of the supported catalyst useful for the fixed bed are usually about 3 to about 50 mm, preferably about 5 to about 25 mm in size. In the case of the fluidized bed, it is preferable to use the supported catalyst as suspended in the waste water like a slurry in such an amount that it will form a fluidized bed within the reactor, namely in an amount of usually about 0.5 to about 20% by weight, preferably about 0.5 to about 10% by weight, based on the resulting suspension. For the actual operation with the fluidized bed, it is preferred to feed the supported catalyst to the reactor as suspended in the waste water like a slurry, separate the the catalyst from the treated water resulting from the reaction by sedimentation, centrifuging or like suitable method and reuse the separated catalyst again. To facilitate the separation of the catalyst from the treated water, therefore, the supported catalyst useful for the the fluidized bed is advantageously about 0.15 to about 0.5 mm in particle size.

When the process of this invention is conducted in the presence of oxygen in less than the theoretical amount, various gases can be used as the oxygen source. Examples of gases useful in this invention are air, oxygen-enriched air, oxygen, oxygen-containing waste gases containing as impurities one or more of hydrogen cyanide, hydrogen sulfide, ammonia, sulfur oxide, organic sulfur compounds, nitrogen oxides, hydrocarbons, etc. The feed rate of the oxygen-containing gases is determinable from the theoretical amount of oxygen required for the decomposition of the ammonia, organic substances and inorganic substances contained in the waste waste. Generally the gas is fed in an amount of about 0.2 to 0.6 time the theoretical amount of the oxygen present in the reaction system. When the oxygen-containing waste gases are used as the oxygen source, the harmful components of the gas can be rendered harmless along with the those contained in the waste water. The oxygen-containing gas may be fed to the reactor at a single level or in two or more levels.

The reaction is carried out at a temperature of usually about 100° to about 370° C., preferably about 200° to about 300° C. The higher the reaction temperature, the higher the efficiency of removal of $NH_4{}^+$ ion and $NO_3{}^-$ ion and the shorter the residence time of the waste water within the reactor but the higher the equipment cost. Accordingly the reaction temperature is determined in view of the kind of the waste water, the degree of desired treatment and operation and equipment costs combined. The reaction pressure therefore needs only to be such that the waste water can at least retain its liquid phase at the predetermined temperature.

When subjecting to wet thermal decomposition the $NH_4NO_3$-containing waste water having incorporated therein ammonia in a mole ratio of $1 < NH_3\text{-}N/NO_3\text{-}N \leq 5$, the reaction is conducted under the same conditions as above.

When subjecting to wet thermal decomposition the $NH_4NO_3$-containing waste water having incorporated therein not more than 1 mole of COD component per mole of $NO_3{}^-$ ion, the reaction conditions are the same as those stated above. Preferred amount of COD component to be added is about 0.1 to about 0.5 mole per mole of $NO_3{}^-$ ion contained in the waste water.

When subjecting to wet thermal decomposition the $NH_4NO_3$-containing waste water having incorporated therein COD component and ammonia, the amount of COD component to be present is the same as above, and the amount of ammonia to be incorporated is in a mole ratio of $1 < NH_3\text{-}N/NO_3\text{-}N \leq 5$. The reaction conditions in this case are also the same as above.

Examples of sources of COD components and ammonia to be incorporated in the waste water include a wide variety of waste water containing these substances such as gas liquors produced in coke oven plants, coal gasifying plants and coal liquefying plants, waste water from gas cleaning processes employed in these plants, waste water from desulfurization process and from cyanide removal process, oil-containing waste water, waste water from activated sludge process, sedimented acitivated sludge, waste water from chemical plants and oil refineries, municipal effluents, sewage, sewage sludge, etc. This means that the processes of this invention can treat these waste waters, together with the ammonium nitrate-containing waste water.

The processes of this invention are capable of treating waste water containing $NH_4NO_3$ in a high concentration with an improved efficiency and reducing the concentration of $NH_4{}^+$ ion and $NO_3{}^-$ ion to a considerable extent. With this advantage, the processes of the invention can easily treat waste water from the processing of uranium ore into nuclear fuel and reprocessing of the used uranium fuel with use of simple equipment which water may contain NH4NO3 in a concentration of 10% or more.

The present invention will be described below in greater detail with reference to the following Examples and Comparison Examples.

EXAMPLE 1

Into a 300 ml-stainless steel autoclave was placed 100 ml of waste water having a pH of 10 and a NH4NO3 concentration of 10% (NH3-N/NO3-N=1). The waste water was treated by thermal decomposition at 250° C. for 60 minutes. The air supplied for pressurizing the autoclave contained oxygen in about 0.01 time the theoretical amount. The autoclave used above was filled with 10 g of a catalyst composed of ruthenium carried on titania particles having a particle size of 5 mm in an amount of 2% by weight based on the weight of titania.

Table 1 below shows the decomposition ratio of the NH4+ ion, NO3− ion and the total nitrogen components, along with the results obtained in Example 2.

EXAMPLE 2

The treatment of waste water was conducted by the same procedure of thermal decomposition as in Example 1 with the exception of using as a catalyst palladium carried on titania particles 5 mm in particle size in an amount of 1% by weight based on the weight of titania.

TABLE 1

|  | Example 1 | Example 2 |
|---|---|---|
| Active component of catalyst | Ru | Pd |
| pH of waste water | 10 | 10 |
| NH4NO3 concentration (%) | 10 | 10 |
| Decomposition ratio of NH3 (%) | 98 | 92 |
| Decomposition ratio of NO3 (%) | 75 | 80 |
| Decomposition ratio of total nitrogen components (%) | 87 | 86 |

EXAMPLE 3

Into a 300 ml-stainless steel autoclave was placed 100 ml of waste water having a pH of 10 and NH4NO3 concentration of 1% (NH3-N/NO3-N=1). The waste water was treated by thermal decomposition at 250° C. for 60 minutes. The air supplied contained oxygen in about 0.2 time the theoretical amount. The autoclave used above was filled with 10 g of a catalyst composed of ruthenium carried on titania particles 5 mm in particle size in an amount of 2% by weight based on the weight of titania.

Table 2 below shows the decomposition ratio of the NH4+ ion, NO3− ion and the total nitrogen components, along with the results obtained in Examples 4 to 12 and Comparison Examples 1 and 2.

EXAMPLES 4 TO 7

The predetermined amount of NH4OH was added to the same kind of NH4NO3-containing waste water as used in Example 3 to adjust the mole ratio of NH3-N/NO3-N and the mixture was treated by the same procedure of thermal decomposition as as in Example 3.

EXAMPLE 8

The treatment of waste water was conducted by the same procedure of thermal decompositon as in Example 3 with the exception of using as a catalyst palladium carried on titania particles 5 mm in particle size in an amount of 2% by weight based on the weight of titania in place of the ruthenium carried on titania.

EXAMPLES 9 TO 12

NH4NO3-containing waste water was treated by the same procedure of thermal decomposition as in Examples 4 to 7 with the exception of using the same kind of the palladium catalyst as used in Example 8 in lieu of the ruthenium catalyst.

COMPARISON EXAMPLE 1

NH4NO3-containing waste water was treated by the same procedure of thermal decomposition as in Example 5 with the exception of not using the catalyst.

COMPARISON EXAMPLE 2

NH4NO3-containing waste water was treated by the same procedure of thermal decomposition as in Example 5 with the exception of using grobules of titania 5 mm in diameter with no active component carried thereon in place of the ruthenium carried on the carrier.

TABLE 2

|  | Active component of catalyst | NH3—N/NO3—N (mole ratio) | Decomposition ratio of NH3 (%) | Decomposition ratio of NO3 (%) | Decomposition ratio of total nitrogen components (%) |
|---|---|---|---|---|---|
| Ex. | | | | | |
| 3 | Ru | 1 | 81 | 42 | 63 |
| 4 | Ru | 1.3 | 97 | 83 | 91 |
| 5 | Ru | 1.9 | 98 | 89 | 95 |
| 6 | Ru | 2.8 | 96 | 81 | 93 |
| 7 | Ru | 3.9 | 93 | 86 | 93 |
| 8 | Pd | 1.0 | 87 | 50 | 70 |
| 9 | Pd | 1.3 | 97 | 80 | 90 |
| 10 | Pd | 1.9 | 98 | 95 | 97 |
| 11 | Pd | 2.8 | 96 | 97 | 97 |
| 12 | Pd | 3.9 | 96 | 95 | 96 |
| Comp. Ex. | | | | | |
| 1 | None | 1.9 | 5.0 | 0.8 | 6.9 |
| 2 | Only titania carrier | 1.9 | 5.2 | 0.8 | 7.1 |

EXAMPLES 13 TO 16

Waste water was treated by the same procedure of thermal decomposition as in Example 3 with the exception of changing the concentration of NH4NO3 and the pH with the results shown below in Table 3.

EXAMPLES 17 TO 19

Waste water was treated by the same procedure of thermal decomposition as in Example 8 with the exception of changing the concentration of $NH_4NO_3$ and the pH with the results shown below in Table 3.

TABLE 3

| Ex. | pH of waste water | Active component of catalyst | $NH_4NO_3$ conc. (%) | Decomposition ratio of $NH_3$ (%) | Decomposition ratio of $NO_3$ (%) | Decompositon ratio of total nitrogen components (%) |
|---|---|---|---|---|---|---|
| 13 | 5.3 | Ru | 1 | 64 | 50 | 59 |
| 14 | 5.0 | Ru | 4 | Over 99 | 67 | 84 |
| 15 | 4.9 | Ru | 7 | 96 | 65 | 82 |
| 16 | 4.8 | Ru | 10 | 99 | 66 | 84 |
| 17 | 5.3 | Pd | 1 | Over 99 | 64 | 83 |
| 18 | 5.0 | Pd | 4 | 86 | 50 | 69 |
| 19 | 4.9 | Pd | 7 | 88 | 40 | 66 |

EXAMPLE 20

Waste water having a pH of 10 and a $NH_4NO_3$ concentration of 10% ($NH_3$-$N$/$NO_3$-$N$=1.88) was fed to a lower portion of a cylindrical stainless high nickel steel reactor at a space velocity of 0.92 1/hr (based on an empty column) to treat the waste water by thermal decomposition while introducing air into the lower portion of the reactor at a space velocity of 17.7 1/hr (based on an empty column in a standard state). The mass velocity of the liquor was 1.2 t/m² hr. The air supplied contained oxygen in about 0.24 time the theoretical amount. The reactor used above was filled with a globular catalyst composed of palladium carried on titania particles 5 mm in particle size in an amount of 2% by weight based on the weight of titania. The thermal decomposition was carried out at a temperature of 250° C. and pressure of 70 kg/cm².

The liquid-gas mixture resulting from the reaction was subjected to heat recovery and led to a liquid-gas separator to separate into a liquid and gas, which were indirectly cooled and taken out of the system respectively.

Table 4 shows the decomposition ratio of $NH_3$, $NO_3$ and total nitrogen components.

None of $NO_x$ and $SO_x$ were detected in the gas phase.

TABLE 4

| | |
|---|---|
| Decomposition ratio of $NH_3$ (%) | 99 |
| Decomposition ratio of $NO_3$ (%) | Above 99 |
| Decomposition ratio of total nitrogen components (%) | Above 99 |

EXAMPLE 21

To waste water to be treated was added $C_6H_5OH$ as a COD component in a mole ratio of COD component to $NO_3$-$N$ of 1:2. Into a 300 ml-stainless steel autoclave was placed 100 ml of the waste water having a pH of 10 and a $NH_4NO_3$ concentration of 1% ($NH_3$-$N$/$NO_3$-$N$=1). The waste water was treated by thermal decomposition at 250° C. for 60 minutes. The air supplied contained oxygen in about 0.2 time the theoretical amount. The autoclave used above was filled with 10 g of a catalyst composed of ruthenium carried on titania particles having a particle size of 5 mm in an amount of 2% by weight based on the weight of titania.

Table 5 below shows the decomposition ratio of the $NH_4^+$ ion, $NO_3^-$ ion and the total nitrogen components, along with the results obtained in Examples 22 to 26.

EXAMPLES 22 AND 23

The predetermined amount of $C_6H_5OH$ was added to $NH_4NO_3$-containing waste water which was different in the pH and $NH_4NO_3$ concentration from the waste water used in Example 21 to adjust the mole ratio of $C_6H_5OH$/$NO_3$-$N$ and the mixture was treated by the same procedure of thermal decomposition as in Example 21.

EXAMPLE 24

The treatment of waste water was conducted by the same procedure of thermal decompositon as in Example 21 with the exception of using as a catalyst palladium carried on titania particles 5 mm in particle size in an amount of 2% by weight based on the weight of titania in place of the ruthenium carried on titania.

EXAMPLES 25 AND 26

The treatment of waste water was conducted by the same procedure of thermal decompositon as in Examples 22 and 23 with the exception of using the same type of palladium catalyst as used in Example 24 in place of the ruthenium catalyst.

TABLE 5

| Ex. | Active component of catalyst | pH of waste water | $NH_4NO_3$ conc. (%) | COD/$NO_3$—N (mole ratio) | Decomposition ratio of $NH_3$ (%) | Decomposition ratio of $NO_3$ (%) | Decomposition ratio of total N components (%) | Decomposition ratio of COD components (%) |
|---|---|---|---|---|---|---|---|---|
| 21 | Ru | 10 | 1 | 0.49 | 94 | 40 | 70 | 85 |
| 22 | Ru | 5.2 | 1 | 0.46 | 97 | 83 | 91 | 98 |
| 23 | Ru | 5.0 | 4 | 0.50 | Over 99 | 86 | 94 | Over 99 |
| 24 | Pd | 10 | 1 | 0.49 | Over 99 | 55 | 78 | Over 99 |
| 25 | Pd | 5.2 | 1 | 0.46 | 95 | 87 | 91 | 95 |
| 26 | Pd | 5.0 | 4 | 0.50 | 77 | 70 | 75 | Over 99 |

EXAMPLES 27 TO 29

To $NH_4NO_3$-containing waste water were added $C_6H_5OH$ and $NH_4OH$. The mixture was thermally decomposed under the same conditions as in Example 21.

The waste water was adjusted to the specified pH with sodium hydroxide in Examples 27 and 28 while no pH adjustment was performed in Example 29.

Table 6 shows the results.

EXAMPLES 30 TO 32

To $NH_4NO_3$-containing waste water were added $C_6H_5OH$ and $NH_4OH$. The mixture was thermally decomposed under the same conditions as in Example 24.

The waste water was adjusted to the specified pH with sodium hydroxide in Examples 30 and 31 while no pH adjustment was performed in Example 32.

Table 6 shows the results.

TABLE 6

| Ex. | Active component of catalyst | pH of waste water | $NH_4NO_3$ conc. (w/v %) | $NH_3$—N/ $NO_3$—N (mole ratio) | COD/ $NO_3$—N (mole ratio) | Decomposition ratio of $NH_3$ (%) | Decomposition ratio of $NO_3$ (%) | Decomposition ratio of total N components (%) | Decomposition ratio of COD components (%) |
|---|---|---|---|---|---|---|---|---|---|
| 27 | Ru | 10 | 1 | 2 | 0.49 | 96 | 85 | 93 | 86 |
| 28 | Ru | 10 | 1 | 2 | 0.46 | 98 | 95 | 97 | 99 |
| 29 | Ru | 10.4 | 4 | 2 | 0.50 | Over 99 | Over 99 | Over 99 | Over 99 |
| 30 | Pd | 10 | 1 | 2 | 0.49 | Over 99 | 86 | 96 | Over 99 |
| 31 | Pd | 10 | 1 | 2 | 0.46 | Over 99 | 97 | 99 | Over 99 |
| 32 | Pd | 10.4 | 4 | 2 | 0.50 | Over 99 | Over 99 | Over 99 | Over 99 |

EXAMPLE 33

To waste water having a $NH_4NO_3$ concentration of 10% ($NH_3$-N/$NO_3$-N=1.88) was added $C_6H_5OH$ as a COD component in a mole ratio of COD component to $NO_3$-N of about 1 : 2 and the mixture was adjusted to a pH of 10 with an aqueous solution of NaOH. The resulting mixture was fed to a lower portion of a cylindrical stainless high nickel steel reactor at a space velocity of 0.95 1/hr (based on an empty column) to treat the waste water by thermal decomposition while introducing air into the lower portion of the reactor at a space velocity of 18.5 1/hr (based on an empty column in a standard state). The mass velocity of the liquor was 2.43 t/m² hr. The air supplied contained oxygen in about 0.4 time the theoretical amount. The reactor used above was filled with a globular catalyst composed of palladium carried on titania particles 5 mm in particle size in an amount of 2% by weight based on the weight of titania. The thermal decomposition was carried out at a temperature of 250° C. and pressure of 70 kg/cm².

The liquid-gas mixture resulting from the reaction was subjected to heat recovery and led to a liquid-gas separator to separate into a liquid and gas, which were indirectly cooled and taken out of the system respectively.

Table 7 shows the decomposition ratio of $NH_3$, $NO_3$ and total nitrogen components.

None of $NO_x$ and $SO_x$ were detectd in the gas phase.

TABLE 7

| | |
|---|---|
| Decomposition ratio of $NH_3$ (%) | Above 99 |
| Decomposition ratio of $NO_3$ (%) | Above 99 |
| Decomposition ratio of total nitrogen components (%) | Above 99 |
| Decomposition ratio of COD component (%) | Above 99 |

We claim:

1. A process for treating ammonium nitrate-containing waste water which comprises subjecting the waste water to wet thermal decomposition in the presence of a catalyst supported by a carrier and containing as an active component at least one of precious metals and compounds thereof insoluble or sparingly soluble in water while maintaining the waste water at a pH of about 3 to about 11.5 and a temperature of about 100° to about 370° C.

2. A process as defined in claim 1 wherein the waste water is subjected to the wet thermal decomposition at a pH of about 5 to about 11.

3. A process as defined in claim 1 wherein the active component of the catalyst comprises at least one of ruthenium, rhodium, palladium, osmium, iridium, platinum and gold.

4. A process as defined in claim 1 wherein the active component of the catalyst comprises at least one of compounds insoluble or sparingly soluble in water of ruthenium, rhodium, palladium, osmium, iridium, platinum and glod.

5. A process as defined in claim 4 wherein the active component of the catalyst comprises at least one of ruthenium dichloride, platinum dichloride, ruthenium sulfide and rhodium sulfide.

6. A process as defined in claim 1 wherein the wet thermal decomposition is carried out in a reactor of the fixed bed type.

7. A process as defined in claim 1 wherein the wet thermal decomposition is carried out in a reactor of the fluidized bed type.

8. A process as defined in claim 1 wherein the wet thermal decomposition is carried out at a temperature of about 200° to about 300° C.

9. A process for treating ammonium nitrate-containing waste water which comprises subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

10. A process as defined in claim 9 wherein the waste water is subjected to the wet thermal decomposition at a pH of about 5 to about 11.

11. A process as defined in claim 9 wherein the active component of the catalyst comprises at least one of ruthenium, rhodium, palladium, osmium, iridium, platinum and gold.

12. A process as defined in claim 9 wherein the active component of the catalyst comprises at least one of compounds insoluble or sparingly soluble in water of ruthenium, rhodium, palladium, osmium, iridium, platinum and glod.

13. A process as defined in claim 12 wherein the active component of the catalyst comprises at least one of ruthenium dichloride, platinum dichloride, ruthenium sulfide and rhodium sulfide.

14. A process as defined in claim 9 wherein the wet thermal decomposition is carried out in a reactor of the fixed bed type.

15. A process as defined in claim 9 wherein the wet thermal decomposition is carried out in a reactor of the fluidized bed type.

16. A process as defined in claim 9 wherein the wet thermal decomposition is carried out at a temperature of about 200° to about 300° C.

17. A process as defined in claim 9 wherein the oxygen-containing gas is fed in an amount of about 0.2 to about 0.6 time the theoretical amount of oxygen.

18. A process for treating ammonium nitrate-containing waste water which comprises the steps of adding to the waste water ammonia in a mole ratio of $1 < NH_3\text{-}N/NO_3\text{-}N \leq 5$, and subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

19. A process as defined in claim 18 wherein the waste water is subjected to the wet thermal decomposition at a pH of about 5 to about 11.

20. A process as defined in claim 18 wherein the active component of the catalyst comprises at least one of ruthenium, rhodium, palladium, osmium, iridium, platinum and gold.

21. A process as defined in claim 18 wherein the active component of the catalyst comprises at least one of compounds insoluble or sparingly soluble in water of ruthenium, rhodium, palladium, osmium, iridium, platinum and glod.

22. A process as defined in claim 21 wherein the active component of the catalyst comprises at least one of ruthenium dichloride, platinum dichloride, ruthenium sulfide and rhodium sulfide.

23. A process as defined in claim 18 wherein the wet thermal decomposition is carried out in a reactor of the fixed bed type.

24. A process as defined in claim 18 wherein the wet thermal decomposition is carried out in a reactor of the fluidized bed type.

25. A process as defined in claim 18 wherein the wet thermal decomposition is carried out at a temperature of about 200° to about 300° C.

26. A process as defined in claim 18 wherein the oxygen-containing gas is fed in an amount of about 0.2 to about 0.6 time the theoretical amount of oxygen.

27. A process for treating ammonium nitrate-containing waste water which comprises the steps of adding to the waste water not more than 1 mole of COD component per mole of $NO_3^-$ ion, and subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

28. A process as defined in claim 27 wherein the waste water is subjected to the wet thermal decomposition at a pH of about 5 to about 11.

29. A process as defined in claim 27 wherein the active component of the catalyst comprises at least one of ruthenium, rhodium, palladium, osmium, iridium, platinum and gold.

30. A process as defined in claim 27 wherein the active component of the catalyst comprises at least one of compounds insoluble or sparingly soluble in water of ruthenium, rhodium, palladium, osmium, iridium, platinum and glod.

31. A process as defined in claim 30 wherein the active component of the catalyst comprises at least one of ruthenium dichloride, platinum dichloride, ruthenium sulfide and rhodium sulfide.

32. A process as defined in claim 27 wherein the wet thermal decomposition is carried out in a reactor of the fixed bed type.

33. A process as defined in claim 27 wherein the wet thermal decomposition is carried out in a reactor of the fluidized bed type.

34. A process as defined in claim 27 wherein the wet thermal decomposition is carried out at a temperature of about 200° to about 300° C.

35. A process as defined in claim 27 wherein the oxygen-containing gas is fed in an amount of about 0.2 to about 0.6 time the theoretical amount of oxygen.

36. A process as defined in claim 27 wherein the amount of the COD component to be added is about 0.1 to about 0.5 mole per mole of $NO^-$ ion.

37. A process for treating ammonium nitrate-containing waste water which comprises the steps of adding to the waste water not more than 1 mole of COD component per mole of $NO_3^-$ ion and ammonia in a mole ratio of $1 < NH_3\text{-}N/NO_3\text{-}N \leq 5$, and subjecting the waste water to wet thermal decomposition in the presence of (i) a catalyst supported by a carrier and containing as an active component at least one of precious metals and compounds thereof insoluble or sparingly soluble in water, and (ii) oxygen in less than the theoretical amount required for decomposing the ammonia, organic substances and inorganic substances present in the waste water to $N_2$, $H_2O$ and $CO_2$ while maintaining the waste water at a pH of about 3 to about 11.5 and a temperature of about 100° to about 370° C.

38. A process as defined in claim 37 wherein the waste water is subjected to the wet thermal decomposition at a pH of about 5 to about 11.

39. A process as defined in claim 37 wherein the active component of the catalyst comprises at least one of ruthenium, rhodium, palladium, osmium, iridium, platinum and gold.

40. A process as defined in claim 37 wherein the active component of the catalyst comprises at least one of compounds insoluble or sparingly soluble in water of ruthenium, rhodium, palladium, osmium, iridium, platinum and glod.

41. A process as defined in claim 40 wherein the active component of the catalyst comprises at least one of ruthenium dichloride, platinum dichloride, ruthenium sulfide and rhodium sulfide.

42. A process as defined in claim 37 wherein the wet thermal decomposition is carried out in a reactor of the fixed bed type.

43. A process as defined in claim 37 wherein the wet thermal decomposition is carried out in a reactor of the fluidized bed type.

44. A process as defined in claim 37 wherein the wet thermal decomposition is carried out at a temperature of about 200° to about 300° C.

45. A process as defined in claim 37 wherein the oxygen-containing gas is fed in an amount of about 0.2 to about 0.6 time the theoretical amount of oxygen.

46. A process as defined in claim 37 wherein the amount of COD component to be added is about 0.1 to about 0.5 mole per mole of $NO_s^-$ ion.

* * * * *